United States Patent
Furlong et al.

(10) Patent No.: US 7,643,508 B2
(45) Date of Patent: Jan. 5, 2010

(54) CLIENT SIDE PID TRANSLATION

(75) Inventors: Jeff Furlong, Grand Bay-Westfield (CA); Alistair John Parker, Quispamsis (CA); Sean Gordon Higgins, Saint John (CA); Gino Louis Dion, McKinney, TX (US)

(73) Assignee: Alcatel Lucent, Paris (FR)

( * ) Notice: Subject to any disclaimer, the term of this patent is extended or adjusted under 35 U.S.C. 154(b) by 605 days.

(21) Appl. No.: 11/264,132

(22) Filed: Nov. 2, 2005

(65) Prior Publication Data

US 2007/0098005 A1 May 3, 2007

(51) Int. Cl.
*H04J 3/16* (2006.01)

(52) U.S. Cl. .................. 370/437; 348/460; 348/461; 725/38

(58) Field of Classification Search ............... 370/437; 725/38; 375/240.27, 240.25
See application file for complete search history.

(56) References Cited

U.S. PATENT DOCUMENTS

| 6,016,172 | A * | 1/2000 | Huh ................. 375/240.27 |
| 2005/0172314 | A1* | 8/2005 | Krakora et al. ............. 725/38 |
| 2007/0098079 | A1* | 5/2007 | Boyce et al. .......... 375/240.25 |

* cited by examiner

*Primary Examiner*—Albert T Chou
(74) *Attorney, Agent, or Firm*—Kramer & Amado, P.C.

(57) ABSTRACT

In a system that provides decoding of A/V streams, this invention reduces switching delays between different streams by modifying the Program Identification (PID) values of the Audio and Video data to respective PID values that are already known by the decoder. This technique allows the decoder to stay in a run state when switching between A/V streams, thereby reducing channel change times.

8 Claims, 1 Drawing Sheet

CLIENT SIDE PID TRANSLATION

FIELD OF THE INVENTION

The invention is directed to providing entertainment over communication networks and in particular to reducing switching delays between broadcast multimedia streams at the subscriber terminals.

BACKGROUND OF THE INVENTION

Use of communication networks for distribution of entertainment, collectively referred to as 'multimedia entertainment content', or 'content', continues to gain popularity fuelled by the decreasing cost of equipment and bandwidth to the home, and emergence of interactive personalized services. These services include TV programming, pay-per-view (PPV), video-on-demand (VoD), games, as well as Internet access.

Because multimedia files tend to be large, the content is currently packaged in information streams, which are transmitted to the user via a broadband communication network.

Sequences of images in a video stream often contain pixels (picture elements) that are very similar or identical, such as the images of a green lawn, a blue sky, etc. Compression and motion compensation protocols, of which MPEG is widely spread today, are typically used to minimize these redundant pixels between adjacent images for improving the use of transmission bandwidth. The video and audio specifications for compression/decompression (encoding/decoding) protocols give the syntax and semantics of encoded streams necessary for communicating compressed digital content as well as for storing and playing such video on media in a standard format.[AIP2]

It is to be noted that this invention is applicable to any multimedia stream format that incorporates milestones within the stream, milestones that can be identified by the decoder and used to synchronize stream startup upon channel change. The ensuing description refers to MPEG (Moving Picture Experts Group described in ISO/IEC 11172) and/or to MPEG2 (described in ISO/IEC 13818) transport streams to describe and illustrate the invention by way of example only, having in view that MPEG protocols are popular today.

To compress (encode) a stream carrying multimedia entertainment content, discrete samples in a stream are transformed into a bit-stream of tokens, which is uses less bandwidth than the corresponding initial stream, since essentially only data that has changed from image to image is captured in the compressed stream, instead of capturing all information from each image. The signal is broken into convenient sized data blocks (frames, or packets), and header information is added to each data block; the header identifies the start of the packets and must include time-stamps because packetizing disrupts the time axis.

The multimedia encoding/decoding format tells the decoder (receiver) how to inverse-represent the compacted stream back into data resembling the original stream of un-transformed data, so that the data may be heard and viewed in its normal form. However, if the decoder is not reset on channel change, it will display noise when channels are switched. Hence, the receiver needs to delay processing video packets from the new channel until a certain pointer (also referred to as key data or a milestone) showing the start of a data block is received.

A MPEG transport stream includes one or more video and audio packetized elementary streams (PES), each PES including an independent timebase for clock recovery and audio/video synchronization information. The transport stream also includes program guide and system information (PSI), which describes the elementary streams which need to be combined to build programs. Conditional access information in each stream enables selective access to the programs and to data services which may be associated with the programs. The PSI includes a Program Association Table (PAT), Program Map Tables (PMT) and Conditional Access Tables (CAT). The PAT includes data that the decoder uses to determine which programs (also referred to as channels) exist in the respective transport stream. The PAT points to a number of PMTs (one per program), which, in turn points to the video, audio, and data content of a respective program carried by the stream. A CAT is used for a scrambled stream.

Each MPEG packet has a fixed size with a program identifier (PID); packets in the same elementary stream all have the same PID, so that the decoder can select the elementary streams it wants and reject the remainder. A PID of '0' indicates that the packet contains a PAT PID. Currently, the elementary video, audio and data streams for the same channel use a different PID.

In general, a client (receiver, decoder, set-top box, or player) has the option to select for viewing one of a plurality of channels, which are broadcast from a head-end or streamed from a server with pre-stored content files. A channel change is performed in response to a request from the client to the server; in response, the server provides the client with the new address from where to receive the new channel. The receiver leaves the currently viewed channel and joins the new channel. Channel change speed is adversely impacted by a plurality of factors, such as PAT/PMT latency, key press propagation (from the channel selector to the server), IGMP leave/join operations latency, packet buffering and propagation, I-frame latency and frame decode and presentation times, to name a few. PAT/PMT latency refers to the time necessary for the decoder to identify and access a PAT frame, in the transport stream, identify in the respective table the PMTs for the respective program, to then access the PMT for identifying the PID for the elementary streams. Once the PIDs for the video, audio, and data content of the respective program carried by the stream are known, the decoder start decoding only the packets that have these PIDs.

Currently, a subscriber terminal joins a channel at a random point in the data stream and has to wait for key data structures (milestones) in the new stream for displaying fully synchronized audio and video. For a MPEG2 stream, the I-frame is one of these key data structures, PAT/PMT are others. Since these milestone data structures are not sent very frequently, the channel change time ranges from several hundreds of milliseconds to a couple of seconds. As such, channel change times less than one second are difficult to achieve today with the current technology. Attempts to reduce the server side delay are currently emerging.

For example, Microsoft has proposed to connect a server (D-server concept) at the edge of a broadband network with a view to provide clients in a certain geographical area with broadcast multimedia streams. The server includes for each stream of multimedia content a buffer that manages and buffers multicast packets in the received stream. When a client device changes channels, it contacts the server which in turn bursts unicast video down to the client device for approximately 20 seconds. The client device immediately begins decoding, and then it joins the appropriate multicast address for that channel and continues decoding the multimedia stream. The problem with this approach is that it requires additional servers at the edge of the network, which increase cost to the overall solution. The other disadvantage to this solution is that it requires additional bandwidth to burst the data to the client device to obtain sub-second channel changing; this again increases cost to the overall solution in addition to requiring careful planning for enabling the network to handle the data bursts when a terminal performs a channel change. This can be a serious problem particularly for HDTV (high definition TV) content, and especially with more then one terminal in the same house.

Another disadvantage of this approach is that the client must be aware of the server, and is not able to change channels if the server is not accessible. Also, messaging is used by the client to request and receive packets that are missing, so that the client does not have any autonomy if the connection with the server is lost for whatever reason.

There is a need for a solution that significantly reduces channel change delays (channel zapping time) without introducing server-side complexity at the edge of the network.

SUMMARY OF THE INVENTION

In a system providing a number of multimedia channels to a set of clients, this invention provides a method to reduce channel change delays by modifying the incoming encoded data into a standard form so that the decoder in the client does not need to scan the incoming stream for milestone index and decode information.

For an multimedia content delivery system where a subscriber terminal (ST) commences rendering multimedia entertainment content of a channel only upon receipt of specified milestone protocol data unit (PDU), a method of reducing the time between leaving a currently viewed channel and joining a new channel, comprising: a) identifying all elementary streams of said new channel; b) changing a current program identification in all PDUs of each said elementary streams to respective program identifications for each said elementary stream; and c) at a decoder of said subscriber terminal, decoding the PDUs with said respective program identifications, as they arrive at said decoder, wherein said decoder is maintained in a running state during said channel change operation.

Advantageously, the invention enables the commencement of decode within the client decoder as soon as it requests a new program (channel), thereby reducing waiting time of arrival of, or randomly searching for, data structures in the data stream. This results in much improved channel changing capabilities.

Another advantage of the invention is that no additional hardware is necessary, there are no additional costs involved with implementing the invention in the existing multimedia delivery systems, or in newly designed multimedia delivery systems.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Figure 1:
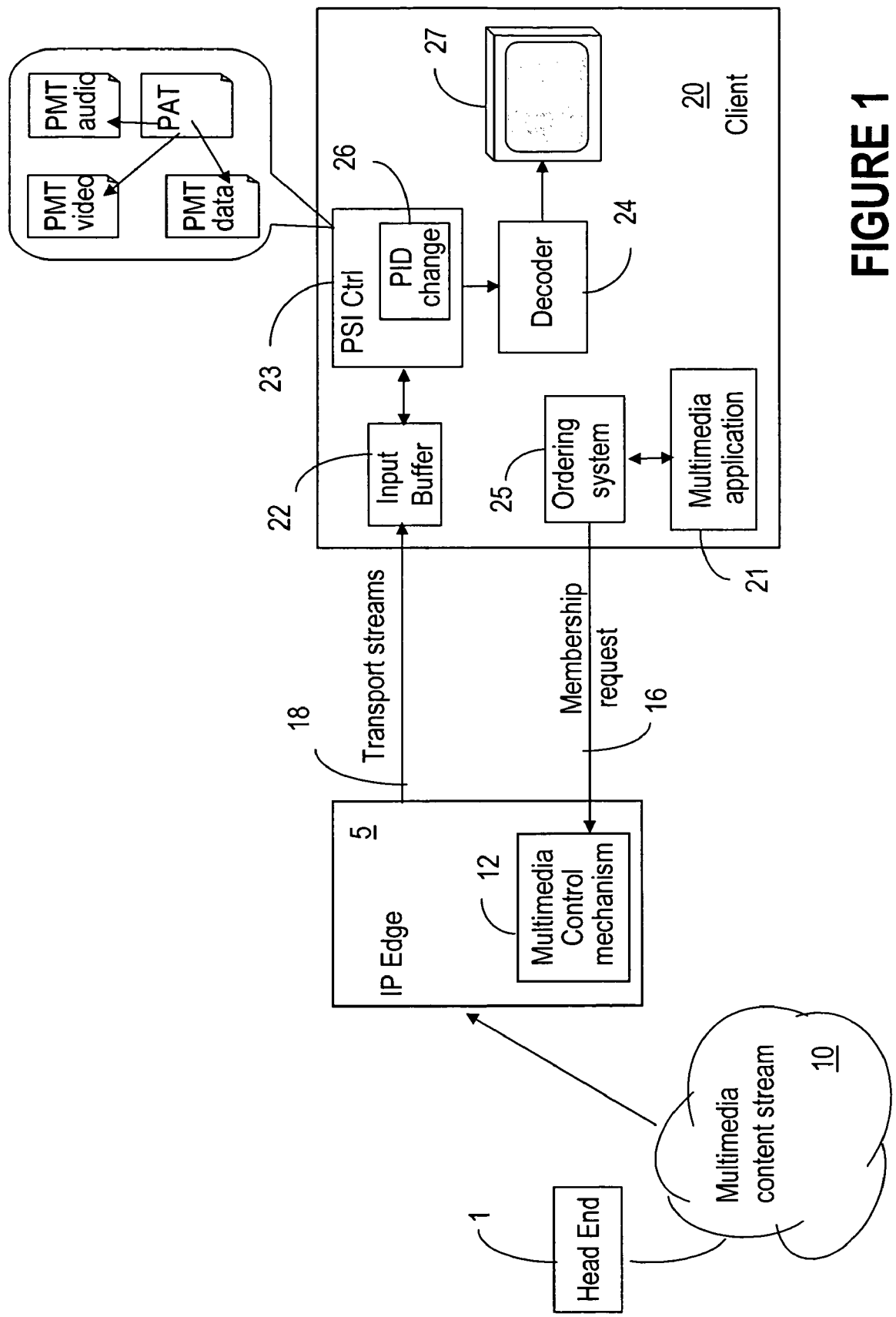
FIG. 1 illustrates an embodiment of the multimedia entertainment system according to the invention.

FIG. 1 shows an embodiment of the multimedia entertainment system according to the invention. The system comprises a server side 5, provided at the edge of a communication network 10, and a client side 20, provided in the subscriber terminal. Server 5, also referred to as an IP edge, receives encoded multimedia entertainment streams form a head-end 1 in the network 10 and provides the content over transport streams 18 to clients 20 upon request.

Relevant to the invention the IP edge 5 includes an multimedia control mechanism (MCM) 12 that sends out messages on a periodic basis to query which clients (subscriber terminals 20) wish to receive multicast traffic. The messages 16 generated by the clients, called membership reports or requests, provide requests to join or leave specific multicasts and indicate the subscriber client multicast address. MCM 12 examines the reports and either enables or disables forwarding of that particular multicast. Various listening mechanisms may be used at the IP edge 5 for detecting a channel change request from the clients, such as a unicast listening HTTP mechanism, (i.e. listening mechanism 12 may be a IGMP snooping interface, a HTTP/Javascript interface which is also available on all set-top boxes, or an RTSP mechanism. Advantageously, if detection of requests is implemented using IGMP snooping, the solution according to the invention will support multicast security enhancements and would time-out clients that no longer respond to IGMP queries. As well, all clients conforming to level-2 of the IP multicasting specification require today IGMP (version 2 or higher).

Clients 20 represent any type of subscriber terminal (ST) enabled with a display 27 for viewing the multimedia entertainment content received from server 5, such as e.g. a subscriber terminal box, a CD or DVD player, a PC, etc. As well known, a ST 20 includes a decoder 24 for converting the content of the elementary streams of multimedia content streams into the respective audio and video information, a multimedia application 21 that enables the user to view and select the content of interest from the server, and an ordering system 25 that transmits membership requests 16 for reception by the listening mechanism 12 of the IP Edge 5.

Relevant to this invention, ST 20 includes an input buffer 22 for storing the input data until a milestone is detected, and a PSI (program and system information) controller 23 that detects the milestones in the stream and instructs the decoder to start decompressing/decoding data. As indicated above, the program and system information includes a Program Association Table (PAT), the Program Map Tables (PMT) and Conditional Access Tables (CAT, not shown). The PAT includes data that the decoder uses to determine which programs exist in the respective transport stream. PAT points to a number of PMTs (one per program), which, in turn points to the PID of the video, audio, and data elementary streams of a respective program carried by the stream. As indicated above, delivery of A/V streams commences as soon as (but not until) the decoder receives critical milestone information required to decode the A/V stream. Since program guide and system information is send to the subscriber terminal before the respective content, the PID for the requested channel is already known at terminal 20, so that the decoder does not need to establish the correspondence between the PID of the of the elementary streams to re-assemble the respective stream. Thus, unit 23 retrieves the system information from the streams buffered in the input buffer 22 for each elementary stream in the respective transport stream.

The PSI controller 23 includes a PID change unit 26 that modifies in a transport stream the values of the program identifier (PID) in packets of each of the audio and video elementary streams to respective PID values, already known at the decoder. In other words, with the present invention, all packets of audio, video and other related data in the transport stream are referenced by respective PID values. For example, if a PID of "0.times.10" is used to represent the audio data, then every other elementary stream in a transport stream that contains audio data always uses the same "0.times.10" PID.

Thus, when the decoder is first initialized, it does a search for a PAT/PMT table to determine the audio and video PID values that it will use to identify the different elementary streams for proper decoding—these audio and video PID values are controlled by the PID change unit. Normally, when a channel change takes place, the decoder must stop and restart, which causes the decoder to begin the whole searching process again. With this invention, the decoder only searches once; therefore, on a channel change, the PID change unit 26 forces all video/audio elements to be the same PID values as when the decoder was first initialized. On initialization, pre-defined PID values that are in the first joined multimedia stream may be used to replace the PID values on all channels that are joined after that. Alternatively, pre-selected PID values may be used, and the PID value of any new channel that the client joins may be changed to the selected PID values, even on the first joined channel. This causes the decoder to stay in a decode mode, which eliminates the need to stop and restart the decoder and eliminates the need for the decoder to determine if the PID values have changed.

This information is processed separately and is sent to the decoder 24 before sending any other data. This enables the decoder to immediately select the packets in the requested channel and decompress correctly the data. Since the respective PID values of the elementary streams of a transport stream are always the same, the decoder always stays in a run state, allowing only the content to change and decreasing the delay to switch between different A/V streams. By allowing the decoder to stay in a run state when switching between the streams, channel change times can be reduced significantly.

It is to be noted again that the invention is not restricted to MPEG streams, but is applicable to any transport stream having a significant milestone corresponding to a full picture and characterized in that stream rendering cannot commence until certain milestone packets (or key structures) have been received, which indicate where the audio, video, and other data can be found based on the respective PID value associated with each of the elementary streams. Multicast MPEG2 transport stream is an example of such stream, containing audio and video elementary streams, Program Specific Information (PSI) and other data.

We claim:

1. In a multimedia content delivery system where a subscriber terminal (ST) commences rendering multimedia entertainment content of a channel, the channel comprising a plurality of elementary streams, only upon receipt of a specified milestone protocol data unit (PDU), a method of reducing a length of a channel change operation between leaving a currently viewed channel and joining a new channel, comprising:

predefining, with a decoder, on initialization, a plurality of distinct program identification (PID) values, each predefined PID value corresponding to a type elementary stream, wherein each of the elementary streams consists of either audio data, video data, or other related data;

identifying all of the elementary streams of said new channel, wherein said elementary streams comprise a plurality of PDUs including at least one of said specified milestone PDU;

changing, in all PDUs, a current PID value of each said elementary stream to the predefined PID value for the type of each said elementary stream; and at a decoder of said ST, decoding said PDUs with said predefined PID values, as said PDUs arrive at said decoder, wherein said decoder is maintained in a running state during said channel change operation.

2. The method of claim 1, said identifying step further comprising:

buffering all said PDUs of said new channel in a memory at an input buffer of said ST, before sending said PDUs to said decoder;

identifying in said memory a PDU carrying a program specific information regarding said new channel; and based on said program specific information, identifying said current PID values used by each said elementary stream of said new channel.

3. The method of claim 2, wherein said multimedia entertainment content is carried in a Moving Picture Experts Group (MPEG) transport stream.

4. The method of claim 3, wherein said program specific information includes a program association table PAT and a program map table PMT, and wherein said PAT identifies said new channel and said PMT identifies said elementary streams of said new channel.

5. The method according to claim 1, said changing step further comprising:

replacing said current PIP values in all said PDUs in an input buffer for said new channel with said predefined PID values.

6. The method of claim 1, said decoding step further comprising:

extracting from an input buffer said PDUs that have said predefined PIP values, decoding said PDUs that have said predefined PIP values to obtain said multimedia entertainment content, and providing said multimedia entertainment to a user of said ST.

7. A system that reduces switching delays for multimedia channels, the system comprising:

a server side that receives encoded multimedia streams having a plurality of milestones; and a client side that receives said multimedia streams from said server side, said client side comprising:

an input buffer that stores said multimedia streams until a milestone is detected, a program and system information (PSI) controller, coupled to said input buffer, that detects said milestones in said multimedia streams, wherein each multimedia stream comprises a plurality of elementary streams, and changes a current program identification (PID) value in each of the elementary streams in said multimedia streams to a predefined PID value, wherein the predefined PID value corresponds to a type of elementary stream, wherein the elementary streams consist of either audio data, video data, or other related data, and a decoder that predefines, on initialization, the predefined PID values for each of the types of elementary stream, and converts said multimedia streams from said PSI controller into audio and video information for display.

8. A program and system information (PSI) controller that modifies program identifiers (PIDs) in multimedia streams, wherein each multimedia stream comprises a plurality of elementary streams, each elementary stream consisting of one type of data, said PSI controller comprising:

means for modifying a Program Association Table (PAT), said PAT determining which programs exist in said multimedia streams;

means for modifying Program Map Tables (PMTs), identified by said PAT, that point to PIDs of data in said multimedia streams; and a PID change unit that changes a current PID value in each of the elementary streams in said multimedia streams to a predefined PID value, wherein the predefined PID value corresponds to said one type of data, wherein the types of data include audio, video, and other related data.

* * * * *

UNITED STATES PATENT AND TRADEMARK OFFICE
CERTIFICATE OF CORRECTION

| | |
|---|---|
| PATENT NO. | : 7,643,508 B2 |
| APPLICATION NO. | : 11/264132 |
| DATED | : January 5, 2010 |
| INVENTOR(S) | : Jeff Furlong et al. |

It is certified that error appears in the above-identified patent and that said Letters Patent is hereby corrected as shown below:

Col. 5, Claim 1, line 11, the word "of" should be before the word "elementary".

Col. 6, Claim 6, lines 4 and 5, "PIP" should be "PID".

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO.        : 7,643,508 B2
APPLICATION NO.   : 11/264132
DATED             : January 5, 2010
INVENTOR(S)       : Furlong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this

Twenty-first Day of December, 2010

David J. Kappos
*Director of the United States Patent and Trademark Office*